(12) United States Patent
Kone

(10) Patent No.: US 8,204,481 B2
(45) Date of Patent: Jun. 19, 2012

(54) METHOD AND SYSTEM FOR MANAGING AUTONOMOUS SEARCH IN VARIOUS MODES IN A LONG-TERM EVOLUTION ENVIRONMENT

(75) Inventor: Mamadou Kone, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 12/966,618

(22) Filed: Dec. 13, 2010

(65) Prior Publication Data

US 2011/0143738 A1 Jun. 16, 2011

Related U.S. Application Data

(60) Provisional application No. 61/286,394, filed on Dec. 15, 2009.

(51) Int. Cl.
*H04M 1/66* (2006.01)

(52) U.S. Cl. .............. 455/411; 455/160.1; 455/161.1; 455/161.3

(58) Field of Classification Search .............. 455/403, 455/435.1, 435.2, 436, 437, 438, 439, 440, 455/442, 67.11, 115.1, 115.3, 226.1, 226.2, 455/150.1, 160.1, 161.1, 161.3, 411; 370/331, 370/332, 334

See application file for complete search history.

(56) References Cited

U.S. PATENT DOCUMENTS

| | | | |
|---|---|---|---|
| 2002/0160785 A1* | 10/2002 | Ovesjo et al. ............... | 455/453 |
| 2005/0250474 A1* | 11/2005 | Hong et al. .................. | 455/411 |
| 2007/0149206 A1* | 6/2007 | Wang et al. ................. | 455/450 |
| 2008/0198811 A1 | 8/2008 | Deshpande et al. | |
| 2009/0042593 A1 | 2/2009 | Yavuz et al. | |
| 2009/0047931 A1* | 2/2009 | Nanda et al. ............... | 455/411 |
| 2009/0052575 A1 | 2/2009 | Waheed et al. | |
| 2009/0098873 A1 | 4/2009 | Gogic | |
| 2009/0129339 A1 | 5/2009 | Young et al. | |
| 2009/0135952 A1* | 5/2009 | Lee et al. ................... | 375/316 |

(Continued)

FOREIGN PATENT DOCUMENTS

WO 2008102252 8/2008

(Continued)

OTHER PUBLICATIONS

Claussen et al., Self-Optimization of Coverage for Femtocell Deployments, Wireless Telecommunications Symposium, 2008. WTS 2008, Jun. 20, 2008, p. 278-285.

(Continued)

*Primary Examiner* — Cong Tran
(74) *Attorney, Agent, or Firm* — Perkins Coie LLP

(57) ABSTRACT

A method for wireless communication in a Long-Term Evolution (LTE) or LTE-equivalent environment which allows a mobile device to manage autonomous search functions (ASF) is disclosed. In an LTE-equivalent environment, a mobile device may function in several modes, including idle and connected. In either mode, the mobile device may need to use an autonomous search function (ASF) to find or exchange information with base stations. The mobile device first determines the mode the current operation pertains to. When modifying the availability of an ASF, the mobile device distinguishes between the modes that will execute the ASF. When calling an ASF, the mobile device determines the availability of that function based on the device's current mode. In idle mode, the mobile device uses the idle mode ASF. Conversely, in connected mode the mobile device uses the connected mode ASF. The two functions are distinctly managed and operated by the mobile device.

15 Claims, 12 Drawing Sheets

U.S. PATENT DOCUMENTS

| | | | |
|---|---|---|---|
| 2009/0168662 A1 | 7/2009 | Tsuboi et al. | |
| 2009/0168676 A1 | 7/2009 | Olson | |
| 2009/0201879 A1 | 8/2009 | Purkayastha et al. | |
| 2009/0239533 A1* | 9/2009 | Somasundaram et al. | 455/434 |
| 2009/0264077 A1 | 10/2009 | Damnjanovic | |
| 2009/0280808 A1* | 11/2009 | You et al. | 455/435.2 |
| 2009/0305699 A1* | 12/2009 | Deshpande et al. | 455/434 |
| 2009/0316655 A1* | 12/2009 | Prakash et al. | 370/331 |
| 2010/0113020 A1* | 5/2010 | Subramanian et al. | 455/435.2 |
| 2011/0007680 A1* | 1/2011 | Kadous et al. | 370/311 |
| 2011/0009117 A1* | 1/2011 | Breuer et al. | 455/434 |
| 2011/0076987 A1* | 3/2011 | Lee et al. | 455/411 |
| 2011/0183647 A1* | 7/2011 | Dalsgaard et al. | 455/411 |

FOREIGN PATENT DOCUMENTS

| | | |
|---|---|---|
| WO | 2009063422 | 9/2008 |
| WO | 2008143563 | 11/2008 |
| WO | 2009115897 | 9/2009 |

OTHER PUBLICATIONS

Amirijoo et al., On Self-Optimization of the Random Access Procedure in 3G Long Term Evolution, IFIP/IEEE International Symposium on Integrated Network Management-Workshops, 2009. IM '09, Jun. 1-5, 2009, p. 177-184.

Claussen et al., Self-Optimization of Coverage for Femtocell Deployments, Wireless Telecommunications Symposium, 2008, WTS 2008, Jun. 20, 2008, p. 278-285.

Ericsson; "Clarifications on autonomous search fuction for CSG;" 3GPP TSG-RAN WG2 Meeting #68; R2-096332; Jeju, South Korea; Nov. 9-13, 2009.

3GPP TS 36.304 V8.7.0 (Sep. 2009); 3rd Generation Partnership Project;Technical Specification Group Radio Access Network; Evolved Universal Terrestrial Radio Access (E-UTRA); User Equipment (UE) procedures in idle mode (Release 8); Sep. 2009.

HTC Corporation; "Clarification on the use of autonomous search for proximity detection;" 3GPP TSG-RAN2 Meeting #68bis; R2-100454; Valencia, Spain, Jan. 18-22, 2009.

* cited by examiner

METHOD AND SYSTEM FOR MANAGING AUTONOMOUS SEARCH IN VARIOUS MODES IN A LONG-TERM EVOLUTION ENVIRONMENT

CROSS-REFERENCE TO RELATED APPLICATIONS

This application claims the benefit of U.S. Provisional Application No. 61/286,394, filed on Dec. 15, 2009 and titled METHODS FOR DISTINGUISHING THE USE OF AUTONOMOUS SEARCH IN IDLE MODE FROM CONNECTED MODE, which is incorporated herein by reference in its entirety.

BACKGROUND

In a cellular wireless network, individual base stations define network cells. Mobile devices wirelessly connect to these base stations and transfer connections between cells by handing over sessions to different base stations in the network. When connecting to cells on these networks, mobile devices rely on standards for setting up and managing connections. Such standards include the Global System for Mobile Communications (GSM), Universal Mobile Telecommunications System (UMTS), Interim Standard 95 (IS-95), and Long Term Evolution (LTE). The Third Generation Partnership Project (3GPP) has defined the standards for LTE in 3GPP documents TS 36.101-TR 36.956. In particular, the air interface is referred to as the Evolved Universal Terrestrial Radio Access (E-UTRA). Mobile devices implementing the LTE standards are also backward compatible with earlier air interfaces, including UMTS Terrestrial Radio Access (UTRA) and GSM EDGE Radio Access Network (GERAN).

A mobile device that connects to an LTE network through a base station, often called a Node-B or eNode-B, uses an autonomous search function (ASF) in various situations. ASFs are functions that modify their own functionality in response to external inputs, optimizing search strategy to the environment. Mobile devices use ASFs on an LTE network to scan a range of frequencies to find information broadcast by cells. Information broadcast by UTRA and E-UTRA cells may include the cell's closed subscriber group (CSG) ID, information specifying supported protocols, information specifying supported radio access technology (RAT), and the rating of the cell within its frequency, as well as other information identifying the cell and how to connect to it.

The mobile device may use information about detected cells to initiate proximity detection messages for call handover or handover avoidance. When a mobile device enters or leaves the proximity of another cell while connected to a UTRA or E-UTRA base station, the network may initiate handover messages between the mobile device's current base station and the detected cell's base station. This allows the base station to transfer the mobile device's session between cells without a connectivity lapse. The mobile device sends proximity messages to help the network determine when handover procedures are necessary.

The mobile device may also use an ASF to find cells to camp on in idle mode. A mobile device camps on a cell when the mobile device does not have an active session with a cell but is monitoring cell system information and in most cases paging information. When the mobile device finds closed cells that are on its CSG whitelist, the mobile device will select the CSG cell for camping over normal cells. Closed cells are cells that are not for general use but are dedicated to a particular group of users. One type of closed cell is a femtocell, which is a low-power cell deployed in a subscriber's home to extend connectivity through a broadband Internet connection. A mobile device's CSG whitelist is a list of closed cells it may access. This whitelist may be sent to the mobile device by upper layers of the network. The mobile device may also maintain and update the list upon successfully connecting to a closed cell.

BRIEF DESCRIPTION OF THE DRAWINGS

FIG. 7B is a flowchart of a process for using the idle mode ASF to search for a cell to camp on.

DETAILED DESCRIPTION

A method and system for a mobile device to manage ASFs when operating in an LTE or LTE-equivalent network is disclosed (hereinafter the "ASF management system" or the "system"). In particular, the system enables the mobile device to separately enable or disable ASFs used in various modes. In normal operation mobile devices enter several different operating modes, including idle mode and connected mode. In idle mode, the mobile device is not engaged in a session with a cell and is waiting for the user to initiate a call. In connected mode, the user has initiated a call, such that there is an ongoing session between the mobile device and a particular cell. The mobile device provides a distinct ASF for each of the operating modes, including separate ASFs for connected mode and idle mode. Each of the ASFs is denoted by a separate indicator, such as a function name, a function pointer, or a hardware identifier, and may be executed independently of the other ASFs.

The mobile device may determine when to enable or disable any given ASF based on factors such as the current mode, the state of the mobile device's whitelist, proximity indicators for various cell types, and whether the device needs a new cell to camp on. To use an ASF, the mobile device first determines its current mode. It subsequently determines whether the ASF that the mobile device is attempting to use is enabled for the mobile device's current mode. If the ASF is enabled, the mobile device may then perform further context-specific operations to determine whether the ASF should be used.

Finally, if such operations do not prevent use of the ASF, the mobile device calls the ASF for the mobile device's current mode.

The mobile device has multiple ASFs that it manages and uses corresponding to its various modes. While the device is using its various ASFs to perform tasks, such as proximity detection in connected mode, it may enable or disable other ASFs, such as the idle mode ASF. Disabling other ASFs will not affect the availability of the current ASF. In another embodiment, the mobile device may use any single ASF for multiple purposes, determining whether it can execute the ASF by maintaining separate configuration information specifying whether the ASF is enabled or disabled in various modes. In general, the mobile device may further base ASF availability on the mobile device's current context and system state.

Figure 1:
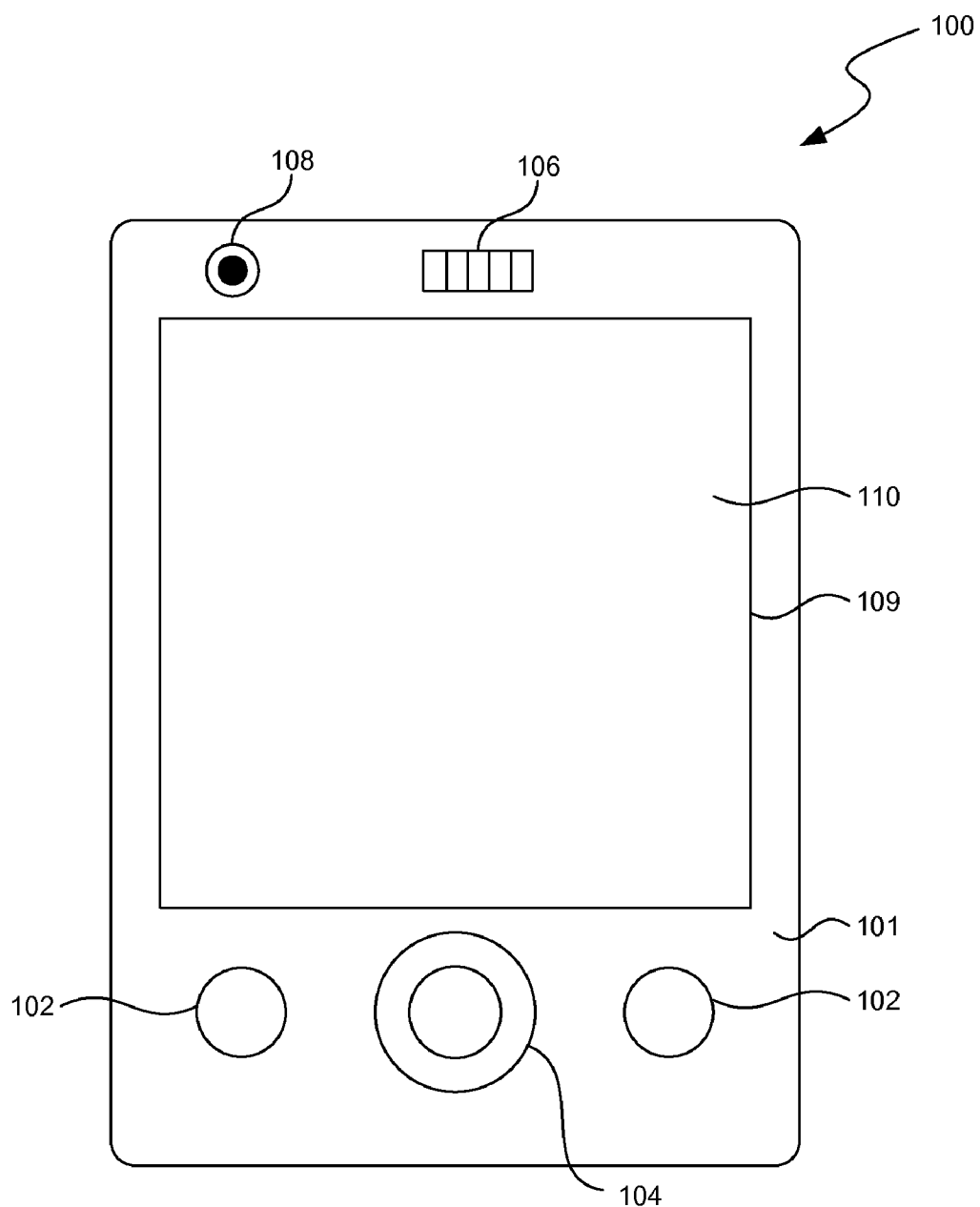
FIG. 1 is a front view of a mobile device suitable for implementing the ASF management system.

FIG. 1 is a front view of a mobile device 100 suitable for implementing the ASF management system. As shown in FIG. 1, the mobile device 100 may include a housing 101, a plurality of push buttons 102, a directional keypad 104 (e.g., a five-way key), a speaker 106, a camera 108, a touch-sensing component 109, and a display 110 carried by the housing 101. The mobile device 100 may also include microphones, transceivers, photo sensors, keyboards, and/or other computing components generally found in PDA devices, cellular phones, laptop computers, tablet PCs, smart phones, handheld network devices, or other mobile communication/computing devices.

The display 110 may include a liquid-crystal display (LCD), a plasma display, a vacuum fluorescent display, a light-emitting diode (LED) display, a field emission display, and/or other suitable types of display configured to present a user interface. The display 110 may also be combined with touch-sensing component 109 to make it a touch sensing display.

A camera 108 is suitable for taking pictures or recording video. The camera 108 includes an optical image sensor and a lens and may also have a flash associated with it for taking pictures in low-light conditions. The mobile device 100 may also include various other peripherals in various locations and configurations. For instance, the camera 108 is shown on the front face of the mobile device 100, but the camera 108 could also be located on the rear face of the device. Additionally, the mobile device 100 might be configured with additional input devices, such as an alternate sliding keyboard.

Figure 2:
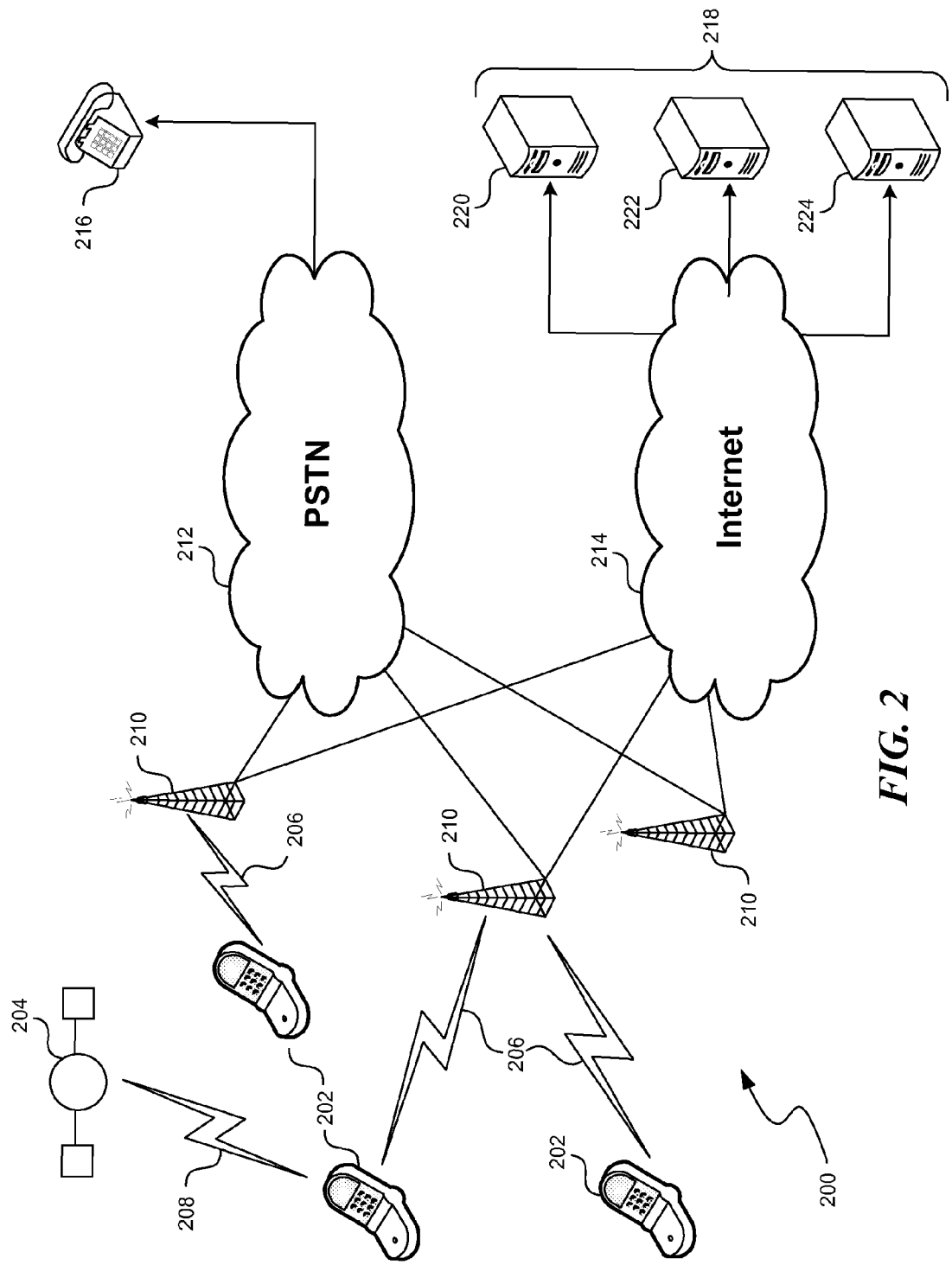
FIG. 2 is a network diagram of a representative environment in which the ASF management system operates.

FIG. 2 is a network diagram of a representative environment 200 in which the ASF management system operates. A plurality of mobile devices 202 roam in an area covered by a wireless network. The mobile devices are, for example, cellular phones or mobile Internet devices, such as the mobile device 100 shown in FIG. 1. The mobile devices 202 communicate with cellular base stations 210 through wireless connections 206. The wireless connections 206 could be implemented using any system for transmitting digital data. For example, a connection could use a cellular network implementing standards such as UMTS, LTE, or CDMA2000 or a non-cellular network implementing standards such as WiFi (IEEE 802.11) or Bluetooth. Although wireless connections are most common for these mobile devices, the devices may also communicate using a wired connection such as Ethernet.

In some configurations, the mobile devices 202 also have Global Positioning System (GPS) receivers embedded in them to provide location information. In these configurations, the mobile devices 202 also receive a location signal 208 from one or more GPS satellites 204. For clarity, the figure only shows one satellite. However, a GPS receiver generally requires several satellites in order to determine its location. Alternatively or additionally, the cellular base stations 210 may, with assistance from the mobile devices 202, employ known signal triangulation and/or signal delay techniques to determine the location of each wireless device.

The cellular base stations 210 are connected to one or more networks that provide backhaul service for the wireless network. The cellular base stations 210 are connected to a Public-Switched Telephone Network (PSTN) 212, which provides a connection between the mobile network and a remote telephone 216 on another network. When a user of one of the mobile devices 202 makes a voice telephone call, the cellular base station 210 to which it connects routes the call through the wireless network's voice backhaul (not shown) to the PSTN 212. The PSTN 212 then automatically connects the call to the remote telephone 216. If the remote telephone 216 is another mobile device, the call is routed through a second wireless network's backhaul to another cellular base station 210. As the mobile device 202 travels between the various geographical areas of base stations 210, the connection 206 is transferred to a base station local to the mobile device 202.

The cellular base stations 210 are also connected to the Internet 214, which provides a packet-based connection to remote devices 218 supporting network applications. When the user of one of the mobile devices 202 communicates through a data connection, the cellular base station 210 for the connection routes the packet data through the wireless network's data backhaul (not shown) to the Internet 214 (or another packet-based network). The Internet connects the wireless network to remote devices 218, including an e-mail server 220, a web server 222, and an instant messenger server 224. Of course, the remote devices 218 could include any application available over the Internet, such as a file transfer protocol (FTP) server or a streaming media server.

Figure 3:
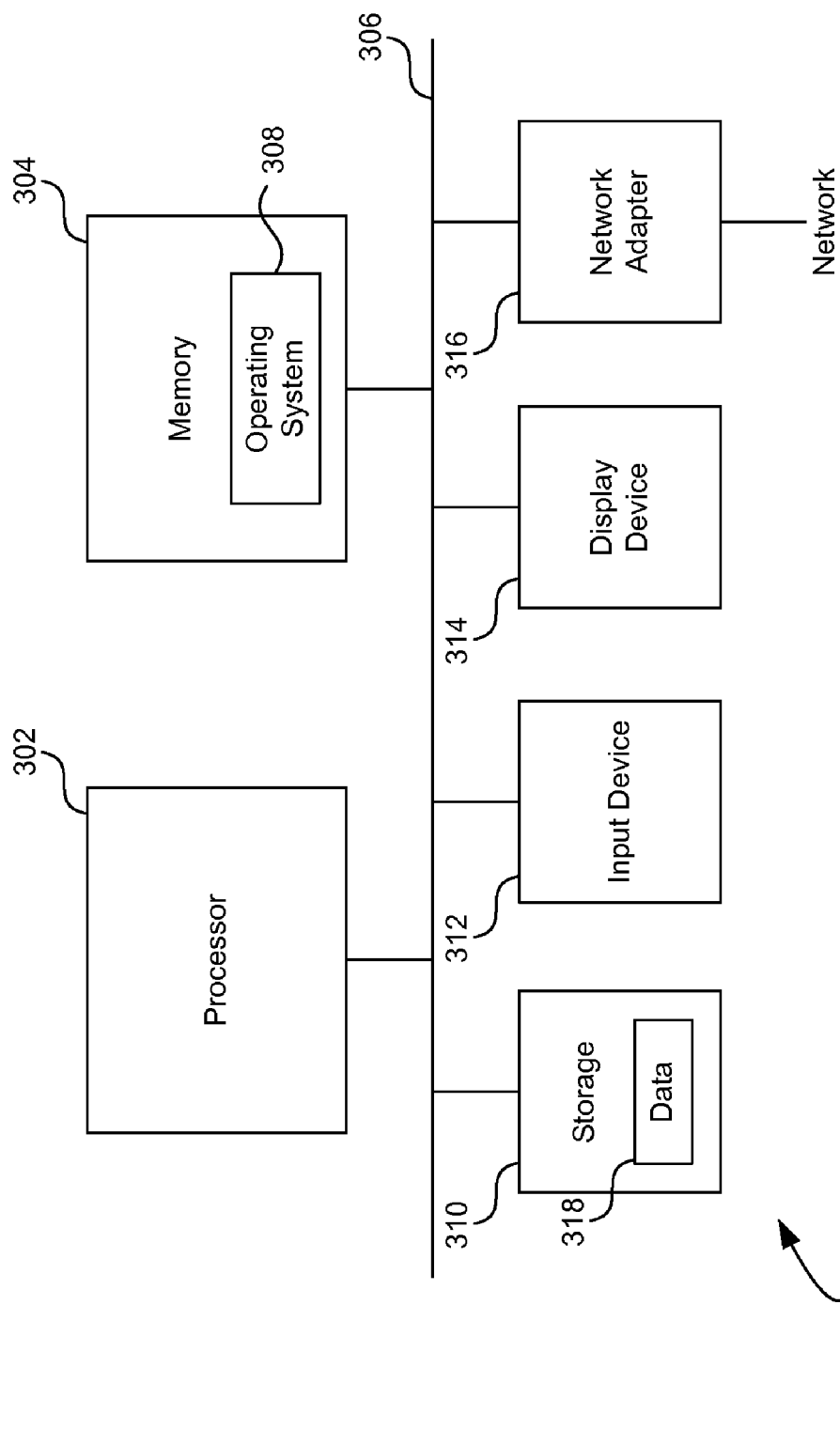
FIG. 3 is a high-level block diagram showing an example of the architecture of a mobile device.

FIG. 3 is a high-level block diagram showing an example of the architecture of a mobile device 300. The mobile device 300 may represent the mobile devices 202 of FIG. 2. The mobile device 300 includes a processor 302 and a memory 304 coupled to an interconnect 306. The interconnect 306 is an abstraction that represents one or more separate physical buses, point-to-point connections, or similar communication channels connected by appropriate bridges, adapters, or controllers. The interconnect 306, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire."

The processor(s) 302 may include central processing units (CPUs) of the mobile device 300 and, thus, control the overall operation of the mobile device 300. In certain embodiments, the processor(s) 302 accomplish this by executing software or firmware stored in the memory 304. The processor(s) 302 may be, or may include, one or more programmable general-purpose or special-purpose microprocessors, digital signal processors (DSPs), programmable controllers, application-specific integrated circuits (ASICs), programmable logic devices (PLDs), or the like, or a combination of such devices.

The memory 304 is, or includes, the main memory of the mobile device 300. The memory 304 represents any form of fixed or removable random-access memory (RAM), read-only memory (ROM), flash memory, or the like, or a combination of such devices. When the mobile device is in use, the memory 304 stores, among other things, an operating system 308 of the mobile device 300.

The mobile device 300 includes one or more input devices 312, which enable a user to control the device. The input device 312 may include a keyboard, trackpad, touch-sensitive screen (e.g., the touch-sensing component 109 of FIG. 1), and/or other standard input device. The mobile device 300 also includes a display device 314 suitable for displaying a user interface, such as the display 110 (FIG. 1). The mobile device 300 further includes a network adapter or modem 316 that provides the mobile device 300 with the ability to communicate with remote devices over a network and may be, for example, a wireless adapter. The mobile device 300 may further include a local storage 310 coupled to the interconnect 306. The local storage 310 may include, for example, a flash memory device or disk drive, that is configured to provide mass storage and that stores data 318 used by the mobile device.

Many mobile devices, such as the mobile device 300, wirelessly connect to networks by implementing the LTE standards. These standards define an ASF that mobile devices execute in various modes. However, mobile devices that implement the LTE standards do not clearly distinguish between the ASFs used in idle and connected modes. The mobile device's current mode is determined based on factors such as whether it has a radio resource control (RRC) connection to a base station. If the mobile device has an RRC connection, it is in connected mode. In this mode, the E-UTRA or UTRA network has established a session with the mobile device, the network is maintaining information about the individual mobile device, and the network has assigned the mobile device a temporary identity for the connected cell. If the mobile device is not in connected mode, it may be in idle mode, in which the mobile device is camping on a cell or searching for a cell to camp on. The network generally does not maintain information about mobile devices operating in idle mode.

When a mobile device disables the indicators that control proximity detection, it also disables the connected mode ASF used for proximity detection. However, because the connected mode ASF and the idle mode ASF are not clearly distinct, when disabling the connected mode ASF, the mobile device may also disable the idle mode ASF. Mobile devices use the idle mode ASF for purposes other than just proximity detection, such as discovering a new cell to camp on. Therefore, it would be useful to have a way of distinguishing the two functions and independently managing when the separate ASFs are enabled or disabled.

Figure 4A:
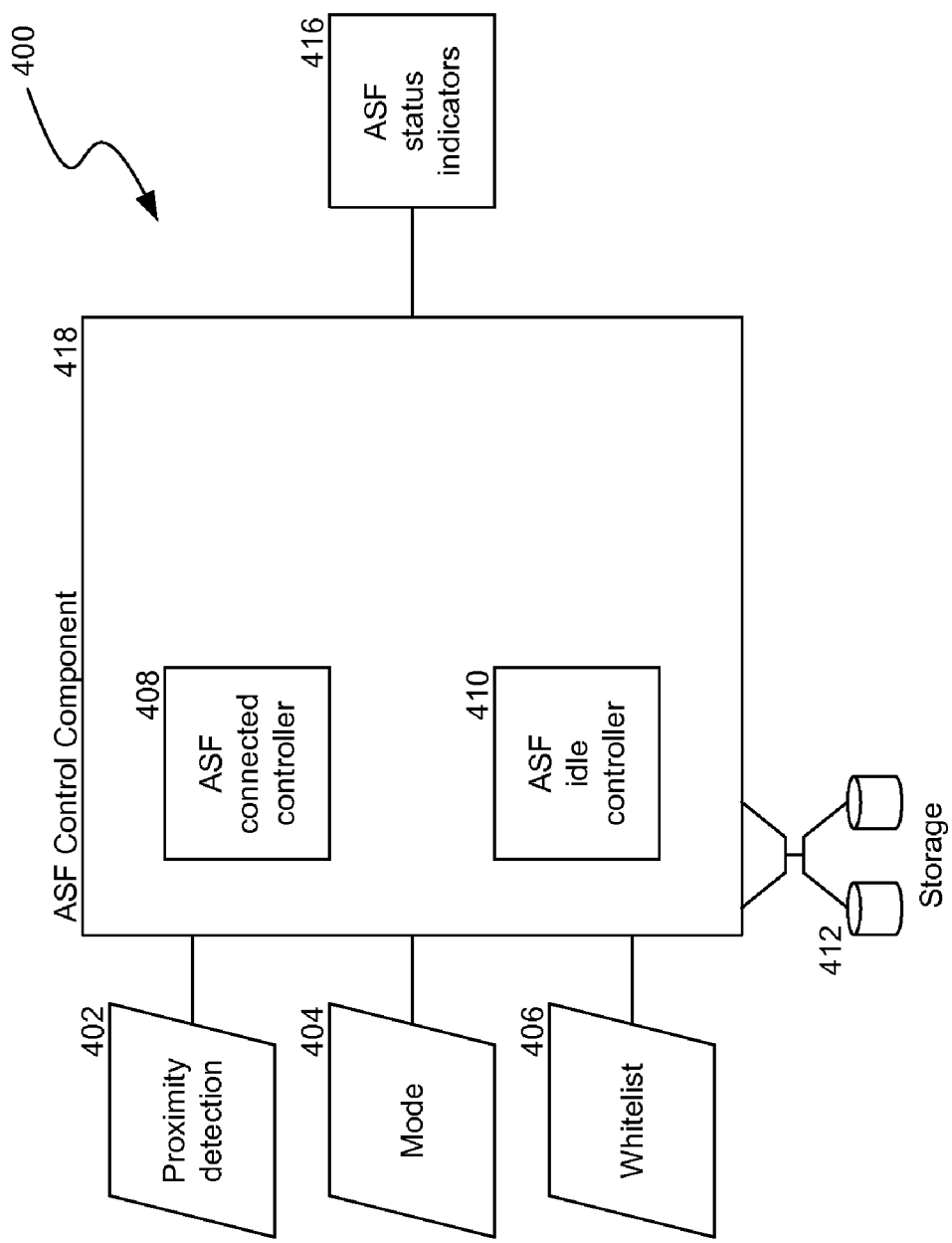
FIG. 4A is a logical block diagram of an ASF control system, which is a subsystem of the ASF management system.
Figure 4B:
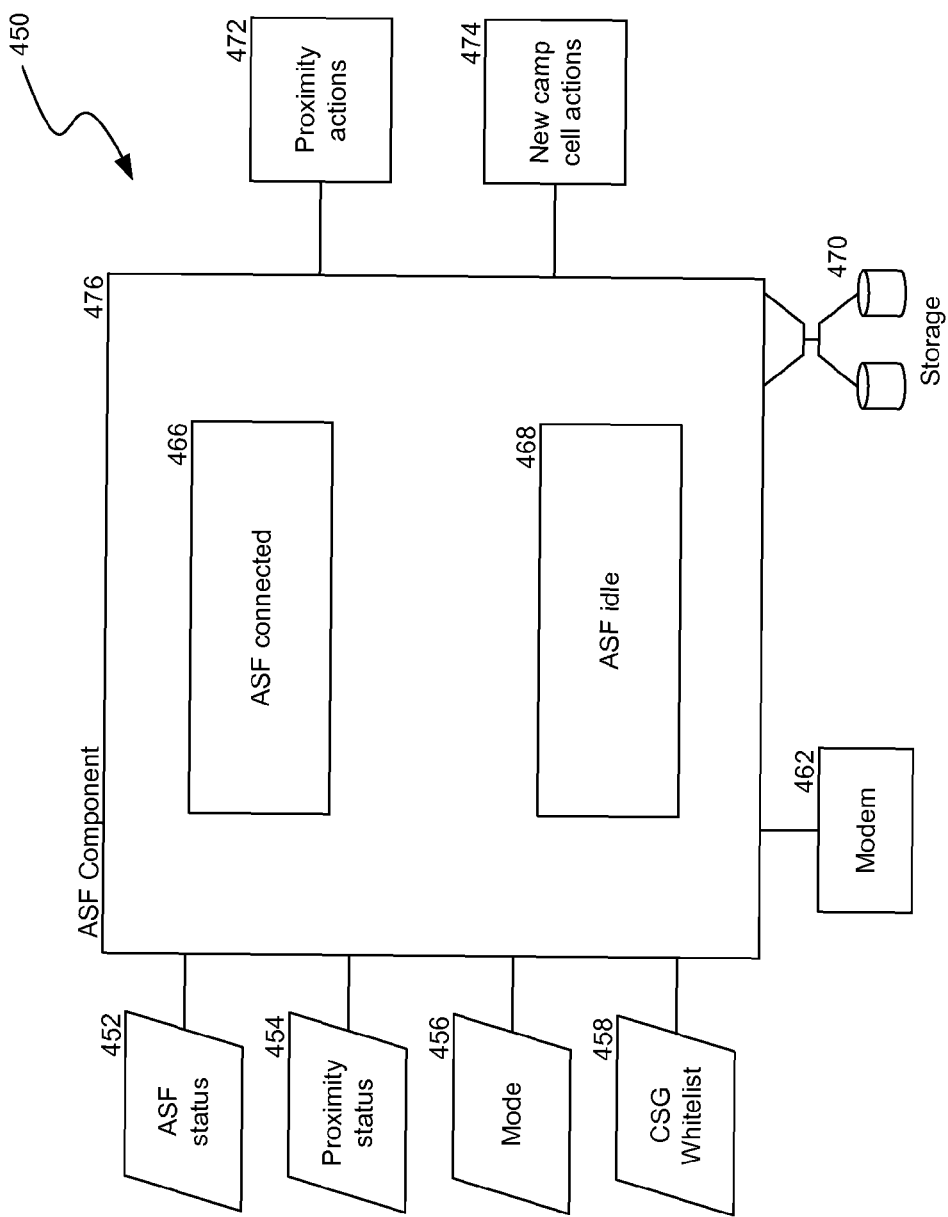
FIG. 4B is a logical block diagram of an ASF calling component, which is a subsystem of the ASF management system.

FIGS. 4A and 4B are high level logical block diagrams showing the modules in a mobile device that implement the discrete ASFs of the ASF management system. A computing device, such as the mobile device 100, may implement the components 400 and 450. Aspects of either system may be implemented as special-purpose hardware circuitry, programmable circuitry, or a combination of these. As discussed in additional detail herein, systems 400 and 450 include a number of modules to facilitate the functions of the system. The modules and their underlying code and/or data may be implemented in a single physical device or distributed over multiple physical devices, and the functionality may be implemented by calls to remote services. Similarly, data could be stored in local storage or remote storage and distributed in one or more physical devices. Assuming a programmable implementation, the code to support the functionality of this system may be stored on a computer-readable medium such as an optical drive, a flash memory, or a hard drive. One skilled in the art will appreciate that at least some of these individual modules may be implemented using ASICs, PLDs, or a general-purpose processor configured with software and/or firmware.

FIG. 4A is a logical block diagram of an ASF control system 400, which is a subsystem of the ASF management system. The ASF control system 400 uses an ASF control component 418 to determine ASF availability based on proximity detection data, whitelist data, current mode, and/or stored data. For both UTRA and E-UTRA type networks, the mobile device maintains proximity indication configuration data, including flags indicating whether proximity indication for cells on its CSG whitelist is "allowed" or "not allowed." Base stations provide data to the mobile device indicating whether proximity indication is enabled; the mobile device stores this data for cells whose CSG IDs are in the mobile device's CSG whitelist. A proximity detection configuration component 402 delivers data on the system's proximity indication configuration to the ASF control component 418.

While a mobile device is operating, it may be in one of several operating modes, such as "connected" or "idle." Mode configuration component 404 provides data on the mobile device's current mode to the ASF control component 418. As stated above, the mobile device determines the current mode based on factors such as whether the mobile device has an RRC connection. If the mobile device has an RRC connection, it is in connected mode. "Connected mode" means the E-UTRA or UTRA network has established a session with the mobile device. In connected mode, the network maintains information about the individual mobile device and assigns the mobile device a temporary identity for its connected cell. At other times, the mobile device operates in idle mode, in which the mobile device is either camping on a cell or searching for a cell to camp on. The mobile device's current mode determines how the device reacts to input, such as input from the modem about the frequencies it is scanning.

As discussed above, the mobile device also maintains a CSG whitelist for cells it has permission to connect to. A whitelist state information component 406 provides data on the state of the mobile device's CSG whitelist to the ASF control component 418. In particular, the whitelist state information component 406 provides information on whether the CSG whitelist is populated and which cells are included in the CSG whitelist.

The system 400 also includes a storage component 412, which is coupled to the ASF control component 418 and may include one or more storage devices, such as the local storage 310 of FIG. 3. The storage component 412 interacts with the ASF control component 418 by receiving data for storage and/or providing previously stored data.

The ASF control component 418 uses the information from the proximity detection configuration component 402, the mode configuration component 404, the whitelist state information component 406, and the storage component 412 to determine whether either of the ASFs should be enabled or disabled. The ASF control component 418 includes an ASF connected controller 408, which uses proximity indication configuration data and current mode data to determine whether to enable or disable the connected mode ASF. The ASF connected controller 408 identifies when the proximity indication configuration for a network type, either UTRA or E-UTRA, switches between enabled and disabled. When the ASF connected controller 408 identifies this switch, it enables or disables the corresponding connected mode ASF functionality. Similarly, an ASF idle controller 410 determines when to enable or disable the idle mode ASF. If the mobile device's CSG whitelist is empty, the ASF idle controller 410 disables the idle mode ASF; otherwise, the ASF idle controller 410 enables the idle mode ASF to allow the mobile device to search in idle mode for CSG cells to camp on. The ASF control component 418 outputs the ASF status indicators for both idle mode and connected mode to an ASF status indicators component 416, which stores ASF status data. In some embodiments, the ASF connected controller 408 and the ASF idle controller 410 only determine the flag values to be stored by the ASF status indicators component 416. Alternatively, the controllers may perform additional operations to enable or disable the ASFs.

The ASF status indicators component 416 holds the results of the functions performed by the ASF control component 418. For instance, the ASF status indicators component 416 may contain an ASF_Idle variable set to "enabled" and an ASF_Connected variable set to "disabled" (or "true" and "false," respectively). Other systems in the mobile device may then determine the status of each ASF by retrieving information from the ASF status indicators component 416. Furthermore, when an ASF indicator changes between enabled and disabled states, the ASF status indicators component 416 may notify the mobile device to perform further actions to propagate the change to other components of the mobile device. Such actions may include notifying other systems on the mobile device that depend on ASF availability, running consistency checks to enable or disable parallel systems, triggering timers to re-enable functionality, or other similar actions.

FIG. 4B is a logical block diagram of an ASF calling component 450, which is a subsystem of the ASF management system. The ASF calling component 450 bifurcates the ASFs to be used in different modes. The ASF calling component 450 includes an ASF status indicators component 452, which delivers data specifying the state of individual ASFs to an ASF component 476. For example, the ASF status indicators component 452 may provide data specifying that the idle mode ASF is disabled and the connected mode ASF is enabled. The data from the ASF status indicators component 452 may be supplied directly or indirectly from block 416 in FIG. 4A. The ASF calling component 450 also includes a proximity status component 454, which provides the system's proximity status to the ASF component 476. The proximity status indicates when the mobile device enters or leaves the proximity of an E-UTRA or UTRA network, indicating that a handover to a different cell for the current session may be needed. The ASF calling component 450 also includes a mode component 456, which provides data on the mobile device's current mode (e.g., connected or idle) to the ASF component 476. A CSG whitelist component 458 provides whitelist data to the ASF component 476 specifying the state and contents of the mobile device's whitelist. The whitelist data may include cell information, such as the cell type and whether the mobile device can connect to it.

The ASF calling component 450 also includes a modem component 462, which provides a hardware link between the mobile device's network adapter or modem and the ASF component 476. This hardware provides a connection to the network and scans for information about cells on various frequencies. ASFs use this information to detect individual cells. A storage component 470 is coupled to the ASF control component 476 and may include one or more storage devices, such as the local storage 310 of FIG. 3. The storage component 470 interacts with the ASF component 476 by receiving data for storage and/or providing previously stored data.

The ASF component 476 receives the data from the ASF status indicators component 452, the proximity status component 454, the mode component 456, the CSG whitelist component 458, and the storage component 470, as well as from the hardware connection provided by the modem component 462, and executes an ASF. The ASF component 476 includes a connected mode ASF component 466, which executes the connected mode ASF. The connected mode ASF component 466 determines whether the connected mode ASF is enabled and whether the mobile device is entering or leaving the proximity of a UTRA or E-UTRA network. This may be determined based on information provided by the modem component 462 and the proximity status component 454. The connected mode ASF component 466 then determines what proximity actions the mobile device should take, such as setting the proximity type to "entering" or "leaving," setting the carrier frequency indicator to "utra" or "eutra," and/or passing these indicators to lower layers. An idle mode ASF component 468 executes the idle mode ASF, which determines whether the mobile device should reselect to camp on a found cell. The ASF component 476 outputs indicators specifying further actions for proximity detection to a proximity action component 472. Similarly, the ASF component 476 outputs indicators specifying actions for new camping cell selection to a camping cell actions component 474.

After either the connected mode ASF component 466 or the idle mode ASF component 468 executes, further processing may be required as a result of cells found by the ASFs. The proximity action component 472 performs actions that result from executing the connected mode ASF component 466. For example, the proximity action component 472 may cause the mobile device to send proximity messages to avoid or initiate handoff procedures. The camping cell actions component 474 performs idle mode actions that result from executing the idle mode ASF component 468. For example, the camping cell actions component 474 may direct the mobile device to send a registration message to a CSG cell to announce its presence and initiate camping on that cell.

Figure 5:
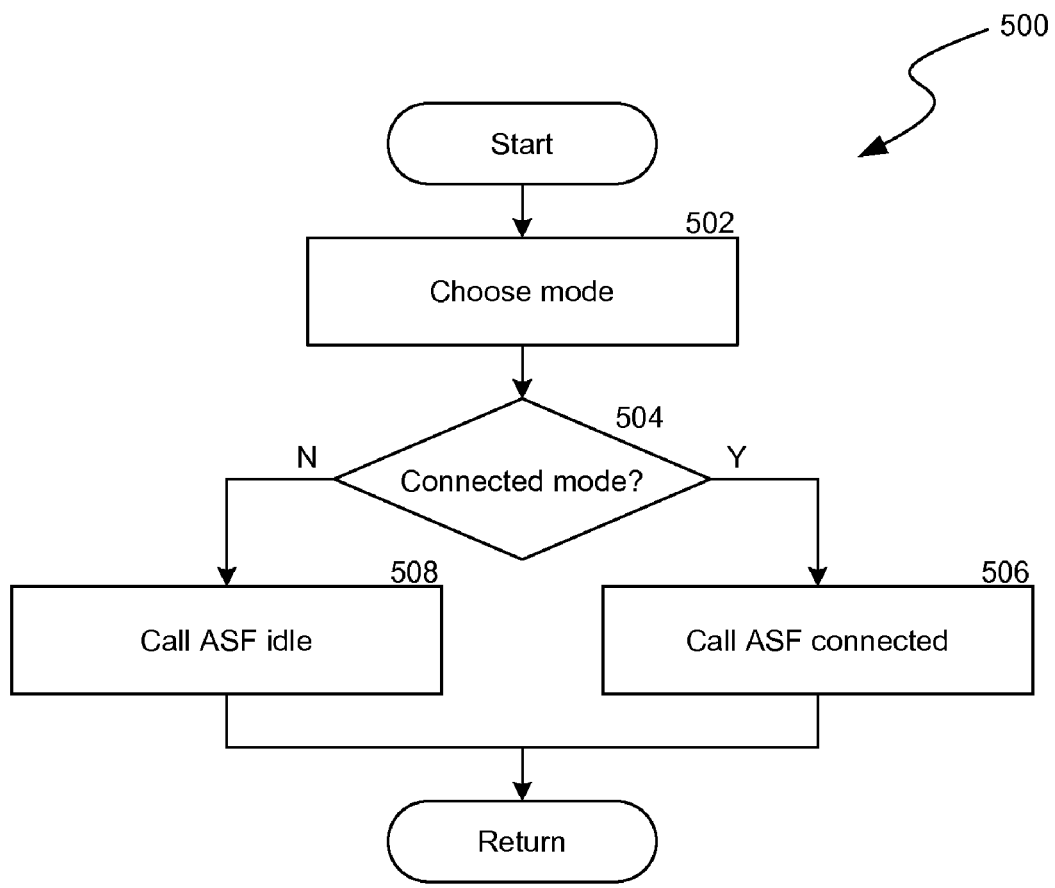
FIG. 5 is a flowchart of a process for calling an ASF based on the mobile device's current mode.

FIG. 5 is a flowchart of a process 500 for calling an ASF based on the mobile device's current mode. The process starts at block 502 when the mobile device enters a mode. For simplicity, FIG. 5 is limited to the basic common modes idle and connected; however, in other implementations, the mobile device may enter other modes. After entering a mode, the process continues at decision block 504; as with other transitions, the transfer from block 502 to block 504 may include the mobile device performing intervening functions. At decision block 504, the mobile device determines which mode it is operating in.

If the mobile device determines that it is operating in connected mode, the process continues at block 506. At block 506 the process calls the connected mode ASF. This includes determining whether the connected mode ASF is enabled, finding local cells, determining whether the mobile device is entering or leaving their geographical area, and if so, sending the correlated proximity messages. This process is discussed in greater detail below with reference to FIG. 6A. From block 506, the process returns.

If the mobile device is not in connected mode at block 504, the process continues at block 508. At block 508 the system calls the idle mode ASF. This includes determining whether the idle mode ASF is enabled, finding cells to camp on, and determining whether the mobile device can connect to them. This process is discussed in greater detail below with reference to FIG. 6B. From block 508, the process returns.

Figure 6A:
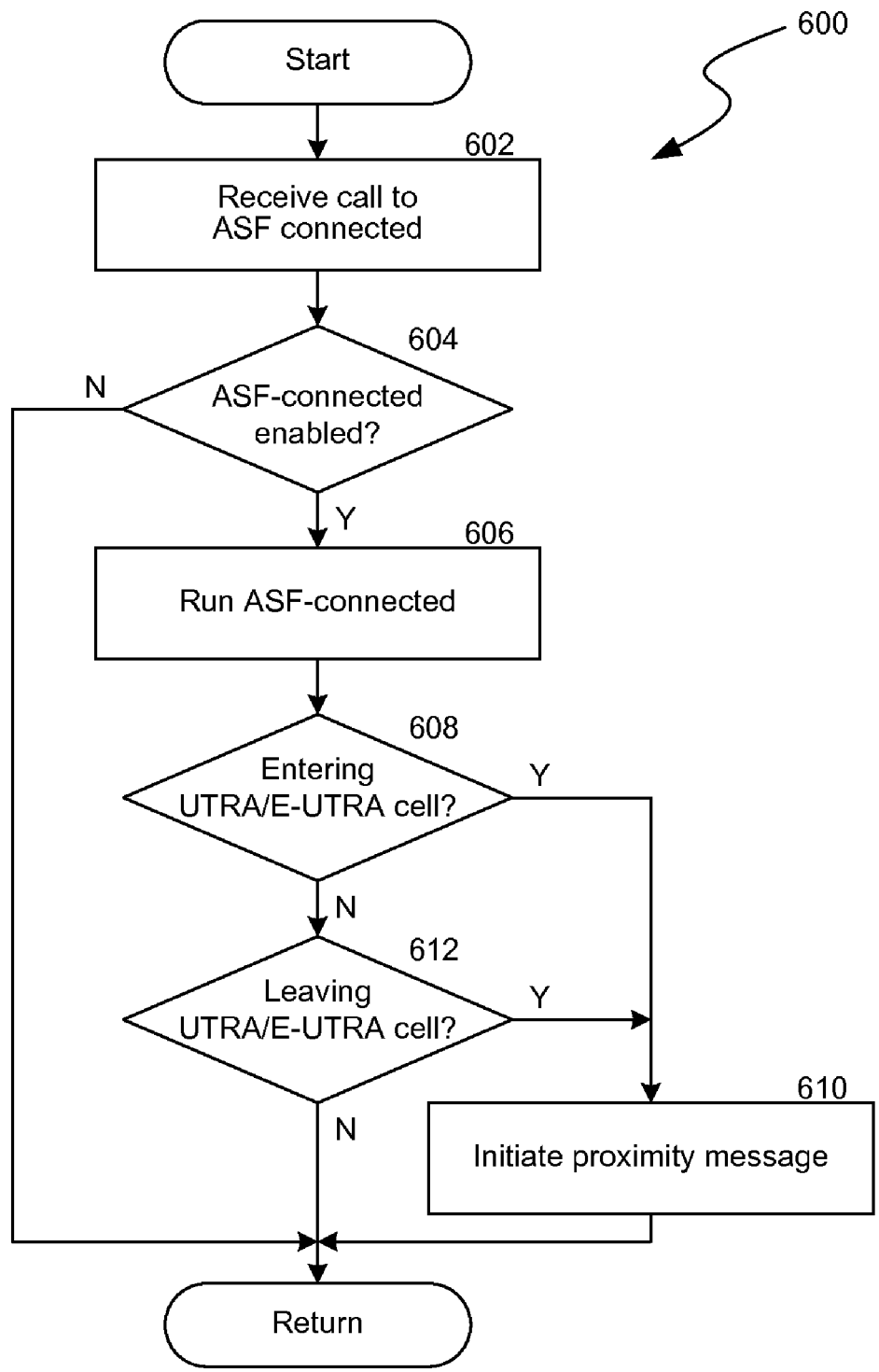
FIG. 6A is a flowchart of a process for executing an ASF when the mobile device is in connected mode.

FIG. 6A is a flowchart of a process 600 for executing an ASF when the mobile device is in connected mode. Processing begins at block 602, where the device receives a call to execute the connected mode ASF. Block 506 of FIG. 5 is an example of how the system may call the connected mode ASF. From block 602, processing proceeds to decision block 604, where the system determines whether the connected mode ASF is enabled. This determination is made based on the flags previously set by the mobile device, which is discussed in greater detail below with reference to FIG. 8A. If the connected mode ASF is enabled, processing continues at block 606; if the connected mode ASF is disabled, the process returns.

At block 606 the system executes the connected mode ASF to detect the proximity of UTRA or E-UTRA networks. In this step, the mobile device locates local cells, determines whether it has proximity information for them, and sends proximity indications when needed. This process is shown in greater detail below with reference to FIG. 7A. Processing continues at decision block 608, where the system determines whether the mobile device is entering the area of a UTRA or E-UTRA cell. The mobile device determines whether the cell is a UTRA or E-UTRA cell based on information broadcast by the cell's base station. If the device is entering a UTRA or E-UTRA cell, processing continues at block 610. Otherwise, processing continues at block 612, where the system uses a similar method to determine whether the mobile device is leaving the area of a UTRA or E-UTRA cell. If the device is leaving the area of a UTRA or E-UTRA cell, processing continues at block 610; otherwise, the process returns.

At block 610, the system initiates a proximity indication message to the base station to inform the base station whether it should start or avoid handover procedures. The message contains the type of proximity: "entering" if the device was determined to be entering at block 608, or "leaving" if the device was determined to be leaving at block 612. The message also contains a variable "carrierFreq," which specifies whether the network type the mobile device is entering is "utra" or "eutra." The message is then passed to lower levels for transmission. Finally, the process returns.

Figure 6B:
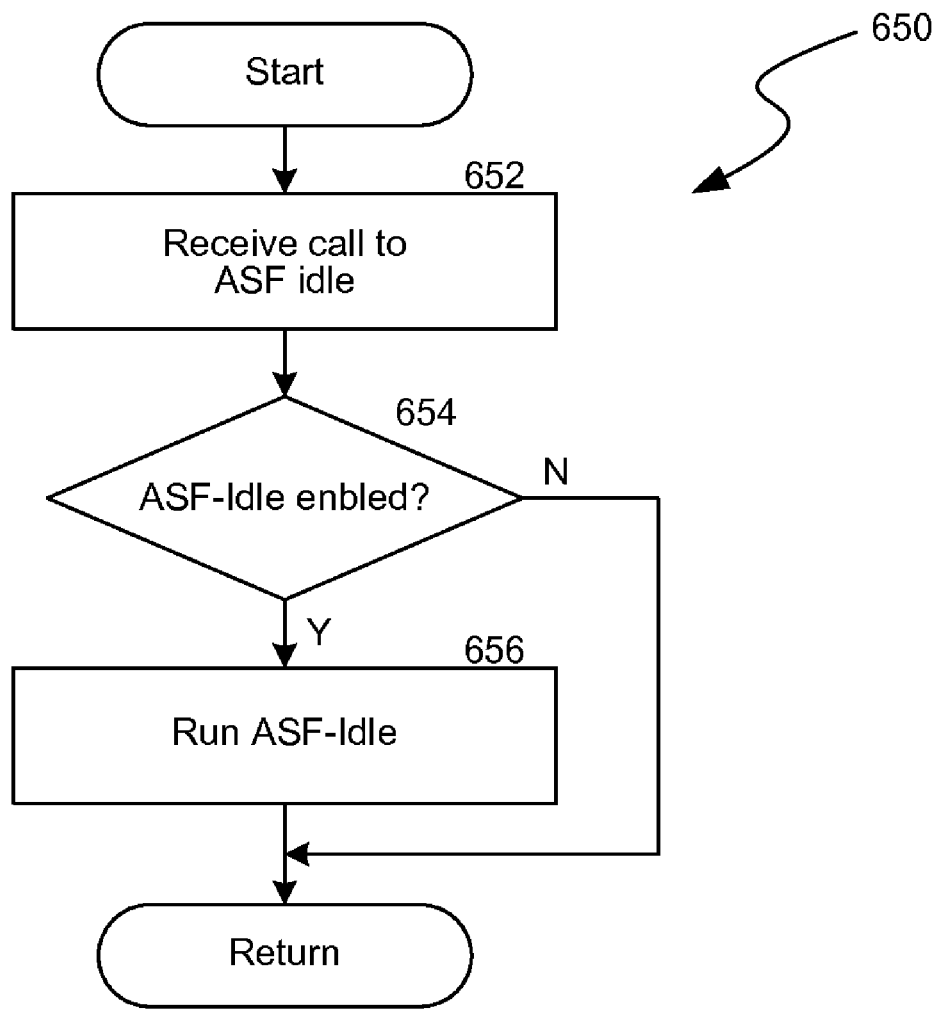
FIG. 6B is a flowchart of a process for executing an ASF when the mobile device is in idle mode.

FIG. 6B is a flowchart of a process 650 for executing an ASF when the mobile device is in idle mode. Processing begins at block 652, where the system receives a function call to the ASF while in idle mode. Block 508 of FIG. 5 is an example of how the system may call the idle mode ASF. From block 652, processing proceeds to block 654, where the system determines whether the idle mode ASF is enabled. The system bases this determination on flags previously set by the mobile device, as discussed below with reference to FIG. 8B. If the idle mode ASF is enabled, processing continues at block 656; if the idle mode ASF is disabled, the process returns.

At block 656, the system executes the idle mode ASF to search for a cell to camp on. The idle mode ASF detects whether there is a cell in the vicinity that the mobile device should connect to. Eligible cells include suitable cells on the same frequency, on a different frequency, and on a different allowed RAT. This process is discussed in greater detail below with reference to FIG. 7B. The process then returns.

Figure 7A:
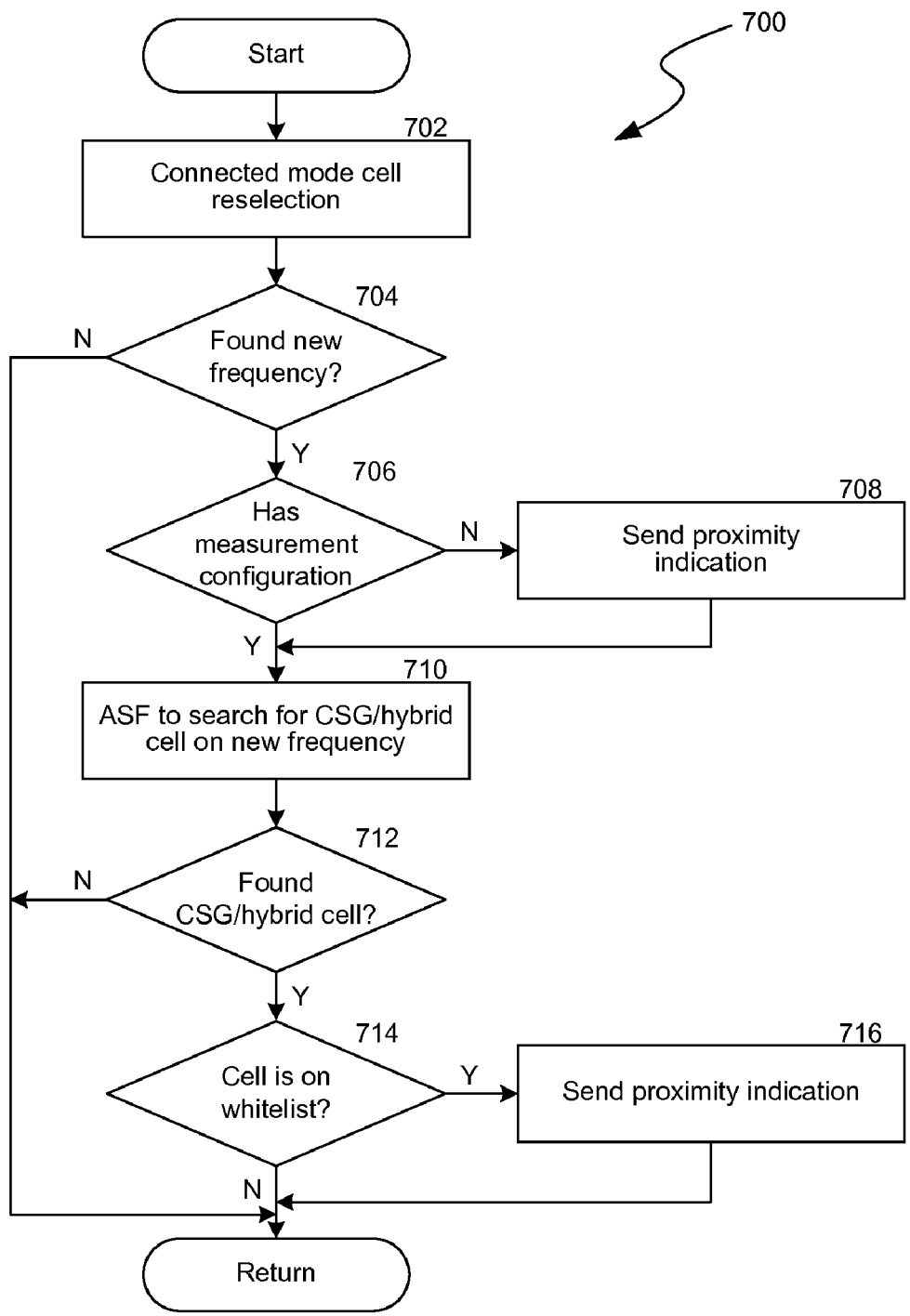
FIG. 7A is a flowchart of a process for triggering or avoiding handover procedures while in connected mode.

FIG. 7A is a flowchart of a process 700 for triggering or avoiding handover procedures while in connected mode. The system in process 700 uses the connected mode ASF to discover CSG cell proximity and uses this data to determine whether it should trigger or avoid handover preparation. Processing starts at block 702, where the system begins the cell reselection process for connected mode. Block 606 of FIG. 6A is an example of how the system starts the connected mode cell reselection process. At block 702, the system uses the mobile device's modem to scan for frequencies in the range on which cell base stations broadcast. UTRA and E-UTRA cells operate channels within a specified range of frequencies. At block 702 the system scans for activity within this range to determine whether there are active cells within the mobile device's broadcast area. The process continues at decision block 704, where the system determines whether there were cells broadcasting on a different frequency from the mobile device's current frequency. If the system found such new frequencies, the process continues at block 706; otherwise the process returns.

Mobile devices need a measurement configuration to decipher communications on any particular frequency. For known frequencies, the mobile device stores measurement configurations, including reporting configurations and measurement gaps. At decision block 706, the system determines whether it already has a measurement configuration for the frequency found at block 702. If the device does not have a measurement configuration for the frequency, the process continues to block 708; otherwise, the process continues to block 710. At block 708, the system sends a proximity indication to the network identifying the frequency and RAT for which the mobile device requests an inter-frequency measurement. When the system receives the inter-frequency measurement, the process continues at block 710.

At block 710, the system uses the connected mode ASF on the newly identified frequency to search for CSG and hybrid cells on that frequency. Hybrid cells are cells that provide service to both CSG members and nonmembers, generally giving priority to CSG members. The process then continues at decision block 712, where the system determines whether it has found a CSG or a hybrid cell. If it has found a CSG or a hybrid cell, the process continues to block 714; otherwise, the process returns.

At decision block 714, the mobile device determines whether the found cell is on the mobile device's CSG whitelist. If the cell is not on the CSG whitelist, the process returns. If the cell is on the CSG whitelist, the process continues at block 716, where the mobile device sends proximity indication messages. Proximity indication messages assist the network in avoiding unnecessary handover preparation. When the mobile device is in the geographical area of the new cell, UTRA and E-UTRA base stations conduct handover preparation from the mobile device's current cell base station to the new cell's base station. If the new base station is not in the mobile device's geographical area, sending the proximity messages increases efficiency by avoiding unnecessary handover preparation. After the system sends the proximity indication message at block 716, the process returns.

Figure 7B:
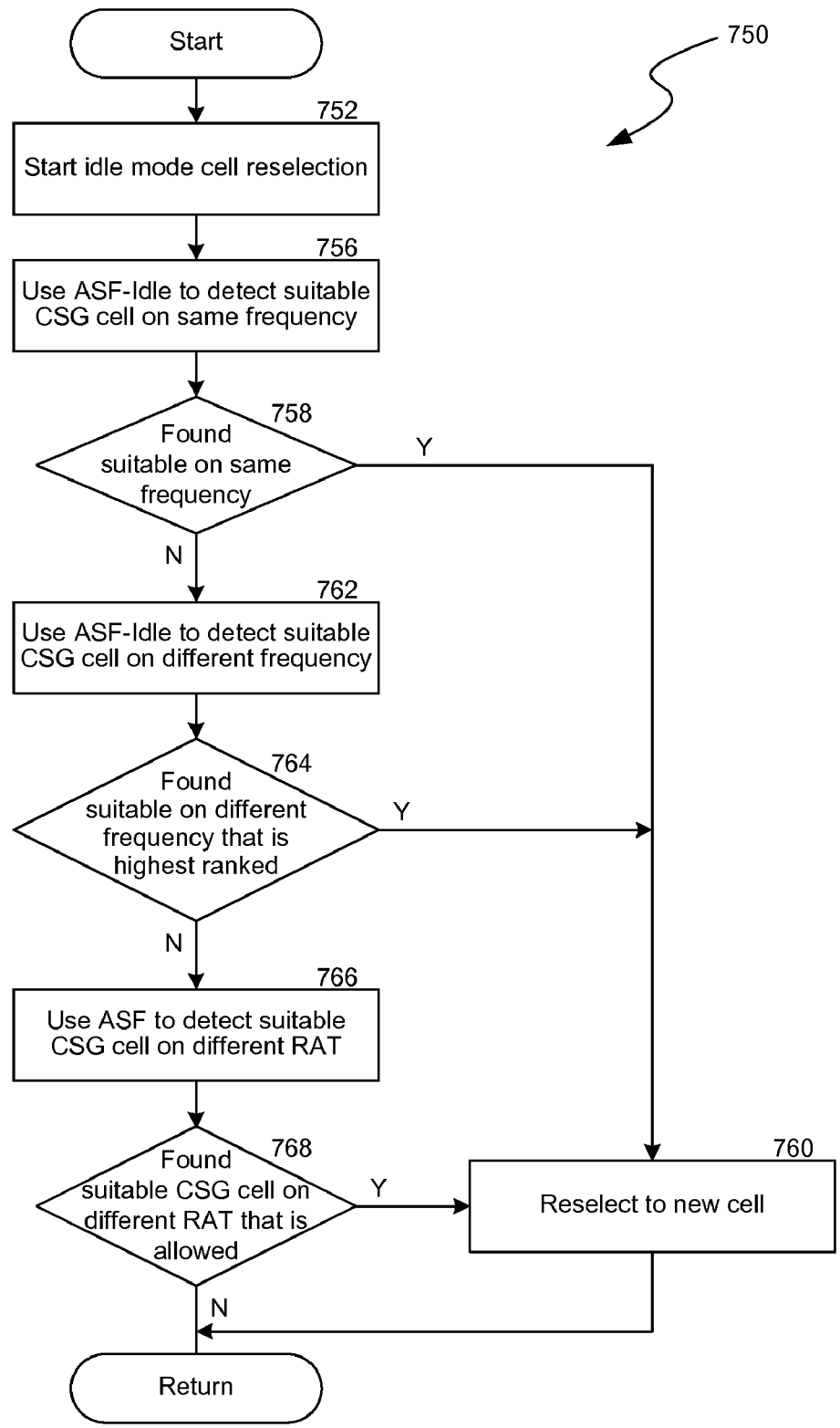

FIG. 7B is a flowchart of a process 750 for using the idle mode ASF to search for a cell to camp on. The process starts at block 752, where the system begins the cell reselection process for idle mode. Block 656 of FIG. 6B is an example of how the system starts the idle mode ASF to search for a cell to camp on. The process then continues to block 756, where the system uses the idle mode ASF to detect suitable CSG cells on the same frequency. A "suitable cell" is a cell on which the mobile device may camp and obtain normal service. Next, at decision block 758, the system determines whether it found suitable CSG cells on the same frequency. If so, the process continues to block 760; otherwise, the process continues to block 762.

At block 762 the system uses the idle mode ASF to detect suitable CSG cells that are transmitting at a different frequency than the one the mobile device is currently using. Processing then proceeds to decision block 764, where the system determines whether it found a high-ranked suitable cell on a different frequency. If the system found a suitable CSG cell on a different frequency, and that cell is the highest-ranked cell on that frequency, it continues to block 760; otherwise, the process continues to block 766.

At block 766, the system uses the idle mode ASF to detect suitable CSG cells on a different RAT. The process then proceeds to decision block 768, where the system determines whether it found a suitable CSG cell on a different RAT that is also an allowed cell. A cell is "allowed" when the mobile device has suitable permissions to connect to that cell's RAT. If the system found such a cell, the process proceeds to block 760. If no such cells were found, the process returns.

At block 760, the system reselects to the new found cell. This cell will be a cell found at block 756, which was a suitable cell on the same frequency, a cell found at block 762, which was the highest-ranked suitable cell on another frequency, or a cell found at block 768, which was a suitable and allowed cell on another RAT. After the reselection process is complete, the process returns.

Figure 8A:
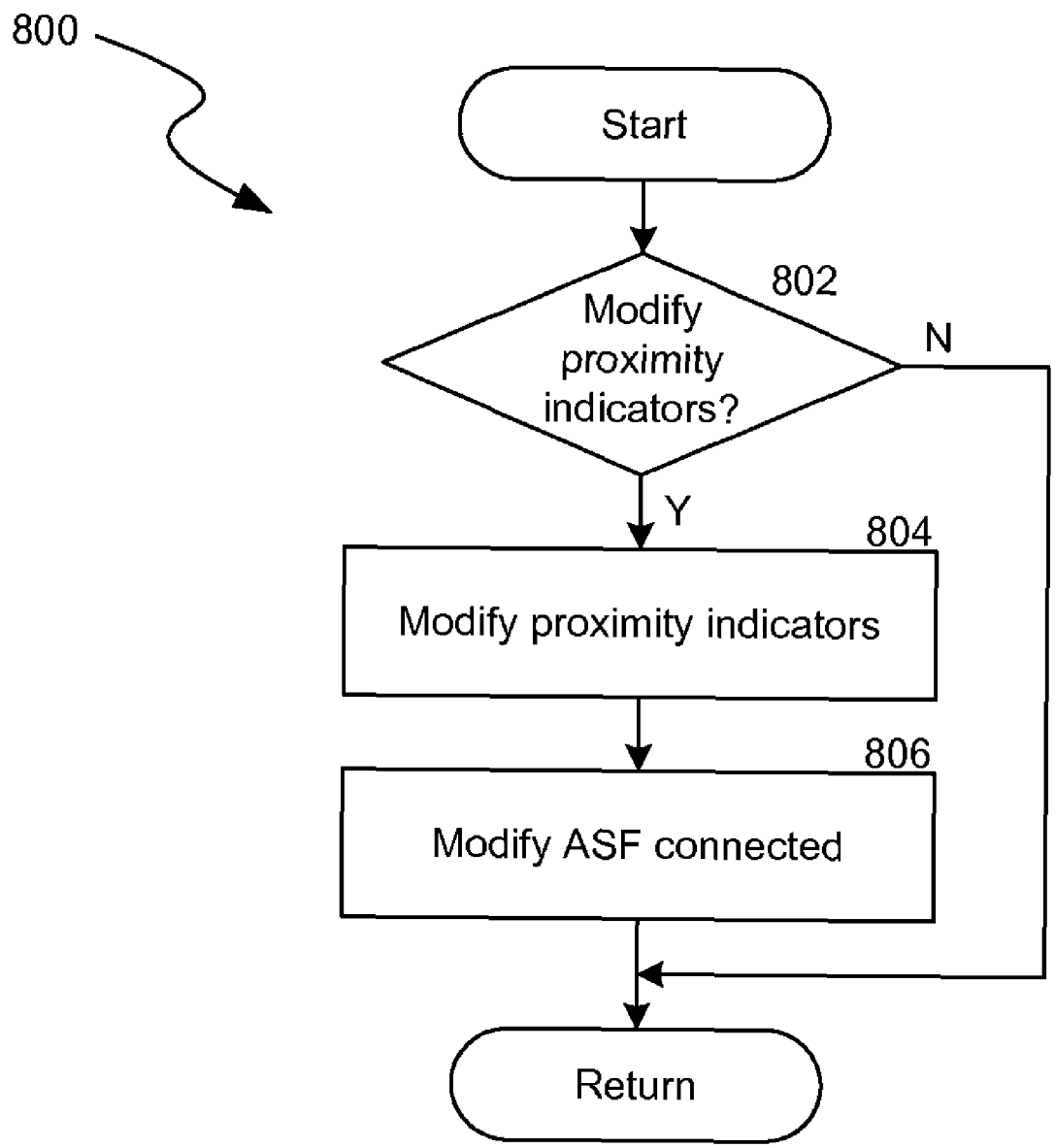
FIG. 8A is a flowchart of a process for modifying the connected mode ASF based on the proximity indicators.

FIG. 8A is a flowchart of a process 800 for modifying the connected mode ASF based on the proximity indicators. At block 802, the system determines whether a modification to the proximity indicators is necessary. A modification is necessary if the system's proximity configuration reporting status, which is maintained for E-UTRA and UTRA, has switched between "allowed" and "not allowed." If no modification is necessary, the process returns. If a modification is necessary (i.e., there has been a proximity reporting configuration change), the process continues at block 804. At block 804, the mobile device enables or disables proximity reporting for some or all UTRA and/or E-UTRA cells. In some embodiments, the system enables or disables proximity reporting only for cells in the mobile device's whitelist. Alternatively, the mobile device may enable or disable proximity reporting for all UTRA and/or E-UTRA cells. The process then continues to block 806, where the system performs the same operation as performed at block 804 (either enable or disable) for the connected mode ASF. The process then returns.

Figure 8B:
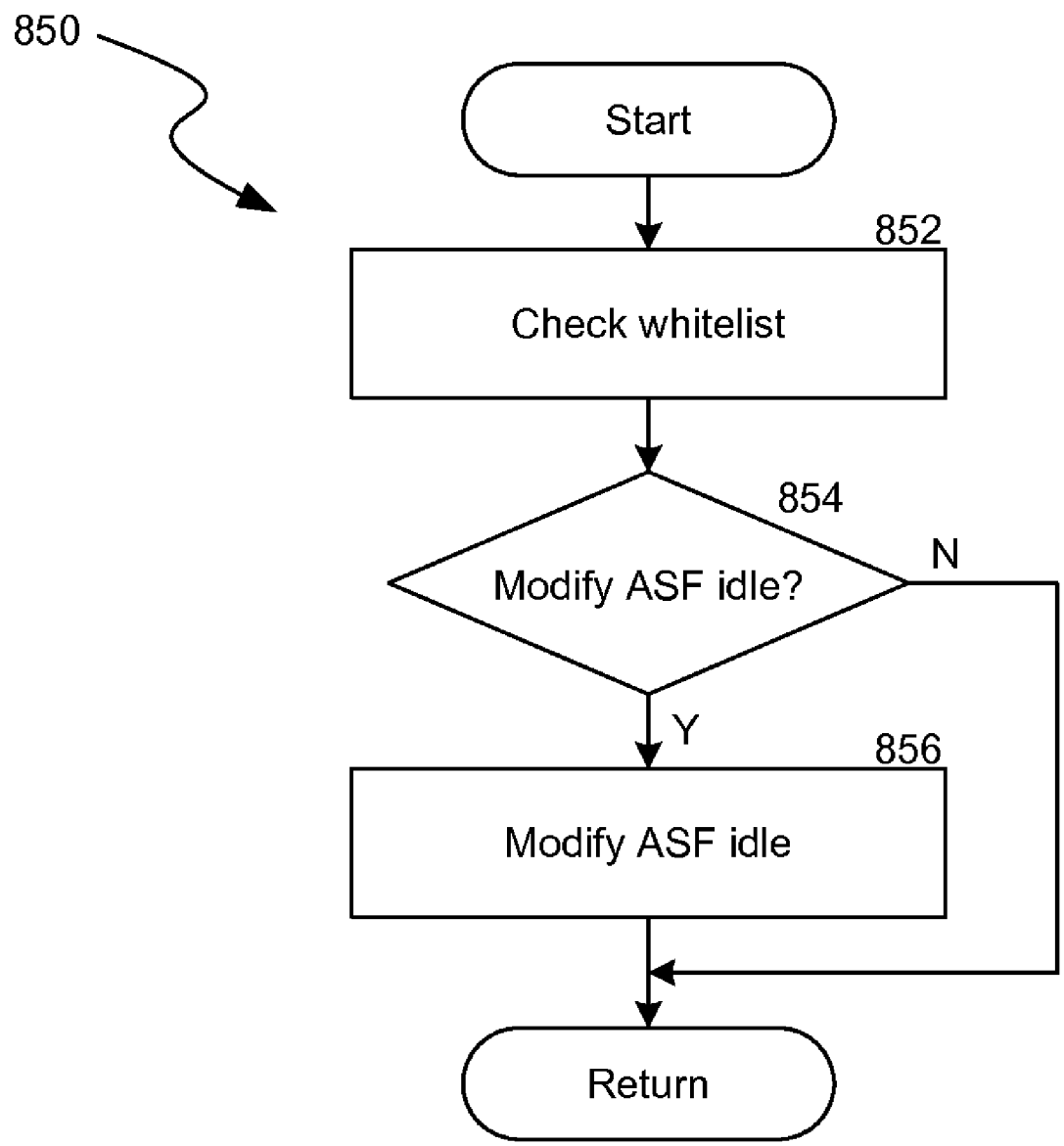
FIG. 8B is a flowchart of a process for modifying the idle mode autonomous search function based on whitelist population.

FIG. 8B is a flowchart of a process 850 for modifying the idle mode autonomous search function based on whitelist population. At block 852, the system examines the population of the mobile device's whitelist. At block 854 the system determines whether a modification to the idle mode ASF is necessary. If the CSG whitelist is empty and the idle mode ASF was enabled, the idle mode ASF should be disabled. Conversely, if the CSG whitelist was not empty and the idle mode ASF was disabled, the idle mode ASF should be enabled. If a modification is not necessary, the process returns. If modification is necessary, the process continues to block 856, where the system enables or disables the idle mode ASF. After the system enables or disables the idle mode ASF, the process returns.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method for managing autonomous search functions in a mobile device comprising a processor and an associated storage area, the method comprising:
    operating the mobile device to communicate on a mobile communications network;
    selecting an operating mode for the mobile device, wherein the operating mode is selected from a group of operating modes including idle mode and connected mode and wherein each operating mode of the group of operating modes is associated with a distinct autonomous search function;
    selecting an autonomous search function based on the selected operating mode; and
    executing the selected autonomous search function.

2. The method of claim 1 wherein each autonomous search function is associated with a status indicator indicating whether the autonomous search function is enabled or disabled and further comprising changing a status indicator of a first autonomous search function associated with a first operating mode of the group of operating modes without changing a status indicator of a second autonomous search function associated with a second operating mode of the group of operating modes.

3. The method of claim 1 wherein the autonomous search function associated with the connected mode is configured to include a proximity detection process.

4. The method of claim 1 wherein each autonomous search function is denoted by a separate indicator.

5. The method of claim 1, further comprising disabling a proximity indication function of the mobile device, wherein disabling the proximity indication function includes disabling the autonomous search function associated with the connected mode.

6. The method of claim 5 wherein disabling the proximity indication function further includes retaining the configuration of the autonomous search function associated with the idle mode.

7. The method of claim 1 wherein a first autonomous search function associated with a first operating mode of the group of modes and a second autonomous search function associated with a second operating mode of the group of modes are separately identified but share at least some common functionality.

8. A system for managing autonomous search functions in a mobile device, the system comprising:
    a processor;
    a storage component;
    a communications component configured to communicate with a wireless network;
    a mode component configured to determine a current operating mode of the mobile device, wherein the operating mode is selected from a group of operating modes including idle mode and connected mode and wherein each operating mode is associated with a distinct autonomous search function; and
    an autonomous search function component configured to select an autonomous search function based on the selected operating mode and execute the selected autonomous search function.

9. The system of claim 8 wherein each autonomous search function is associated with a status indicator indicating whether the autonomous search function is enabled or disabled and further comprising an autonomous search function controller component configured to change a status indicator of a first autonomous search function associated with a first operating mode of the group of operating modes without changing a status indicator of a second autonomous search function associated with a second operating mode of the group of operating modes.

10. The system of claim 8 wherein the autonomous search function associated with the connected mode is configured to include a proximity detection process.

11. The system of claim 8 wherein each autonomous search function is denoted by a separate indicator.

12. The system of claim 8, further comprising:
    a proximity indication configuration component configured to indicate whether a proximity indication function of the mobile device is enabled or disabled; and an autonomous search function control component configured to disable the autonomous search function associated with the connected mode in response to the proximity indication configuration component indicating that the proximity indication function is disabled.

13. The system of claim 12 wherein the autonomous search function control component is configured to disable the autonomous search function associated with the connected mode without changing the configuration of the autonomous search function associated with the idle mode.

14. The system of claim 8 wherein a first autonomous search function associated with a first operating mode of the group of modes and a second autonomous search function associated with a second operating mode of the group of modes are separately identified but share at least some common functionality.

15. A system for managing autonomous search function in a mobile device, the system comprising:
- a processor;
- a storage component;
- a communications component configured to communicate with a wireless network;
- a control component configured to disable a proximity indication function when the mobile device is operating in connected mode;
- wherein when the proximity indication function is disabled, the control component is further configured to disable an autonomous search function while the mobile device is operating in the connected mode and enable the autonomous search function in response to the mobile device moving to idle mode.

* * * * *